(12) United States Patent
Trost et al.

(10) Patent No.: US 11,667,180 B2
(45) Date of Patent: Jun. 6, 2023

(54) COVER FOR AN ELECTRIC AXLE ASSEMBLY

(71) Applicant: Dana Heavy Vehicle Systems Group, LLC, Maumee, OH (US)

(72) Inventors: Harry W. Trost, Royal Oak, MI (US); Steven G. Slesinski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 253 days.

(21) Appl. No.: 17/103,402

(22) Filed: Nov. 24, 2020

(65) Prior Publication Data

US 2022/0161645 A1 May 26, 2022

(51) Int. Cl.
*B60K 1/00* (2006.01)
*B60K 17/22* (2006.01)
*B60K 17/04* (2006.01)

(52) U.S. Cl.
CPC .............. *B60K 1/00* (2013.01); *B60K 17/04* (2013.01); *B60K 17/22* (2013.01); *B60K 2001/001* (2013.01)

(58) Field of Classification Search
CPC .......... B60K 1/00; B60K 17/04; B60K 17/22; B60K 2001/001
See application file for complete search history.

(56) References Cited

U.S. PATENT DOCUMENTS

| | | | |
|---|---|---|---|
| 7,115,057 B2 | 10/2006 | House | |
| 7,232,398 B2* | 6/2007 | Garcia | B60B 35/16 475/221 |
| 7,559,390 B2* | 7/2009 | Marsh | B60K 17/26 180/56 |
| 8,858,379 B2 | 10/2014 | Keeney et al. | |
| 10,239,401 B2 | 3/2019 | Branning | |
| 11,338,660 B2* | 5/2022 | Laforce | B60K 1/00 |

FOREIGN PATENT DOCUMENTS

WO 2019060881 A1 3/2019

* cited by examiner

*Primary Examiner* — John D Walters
(74) *Attorney, Agent, or Firm* — McCoy Russell LLP

(57) ABSTRACT

Methods and systems are provided for an electric axle assembly. In one example, a system, includes a cover plate for a head assembly, wherein a cross-member is integrated into the cover plate and configured to attach to a vehicle frame.

17 Claims, 5 Drawing Sheets

COVER FOR AN ELECTRIC AXLE ASSEMBLY

TECHNICAL FIELD

The present description relates generally to a cover plate attached to an electric axle assembly.

BACKGROUND AND SUMMARY

The demand for electrified vehicles is increasing in order to curb greenhouse emissions. Electric motors may be sized to meet both torque and speed requirements, which may not be optimal for certain operating requirements of some vehicle. For example, relatively large electric motors may be utilized to meet torque requirements, which may result in an oversized motor for other operating requirements of a vehicle, such as during low load operations. Furthermore, electric motors may be difficult to package in some vehicle arrangements. One option to overcome this drawback is to include multiple smaller electric motors. However, this may increase a packaging complexity.

Manufacturers may be slow to electrify vehicles due to difficulties integrating the electric motor into an existing vehicle architecture. Redesigns to the existing vehicle architecture may demand modifications to the chassis or other support structure. This may be further extended to an axle assembly for hybrid vehicles comprising an engine and an electric motor configured to drive the vehicle. Thus, there is a demand for an axle assembly that may seal to existing mounting arrangements and facilitate oil coolant of an electric motor without significant, if any, redesign of the electric motor, chassis, or other architectures of the vehicle.

In one example, the issues described above may be addressed by a system comprising a cover plate for a head assembly, wherein a cross-member is integrated into the cover plate and configured to attach to a vehicle frame. In this way, a rework of the head assembly and vehicle frame may be reduced.

As one example, the cover plate seals the head assembly. A cross-member is integrally arranged with the cover plate, wherein the cross-member extends in a direction normal to a yoke shaft of an electric axle assembly. The cross-member comprises mating features configured to attach to vehicle frame rails. By configuring the cover plate and cross-member in this way, integral cooling circuits and inverters may be easily integrated while saving cost on cables. The design may further enable the cover plate to physically couple to an existing mounting pattern of the head assembly, which may facilitate less complex manufacturing practices. By doing this, enhanced oil cooling may be facilitated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5 are shown to scale, however, other relative dimensions may be used if desired.

DETAILED DESCRIPTION

Figure 1:
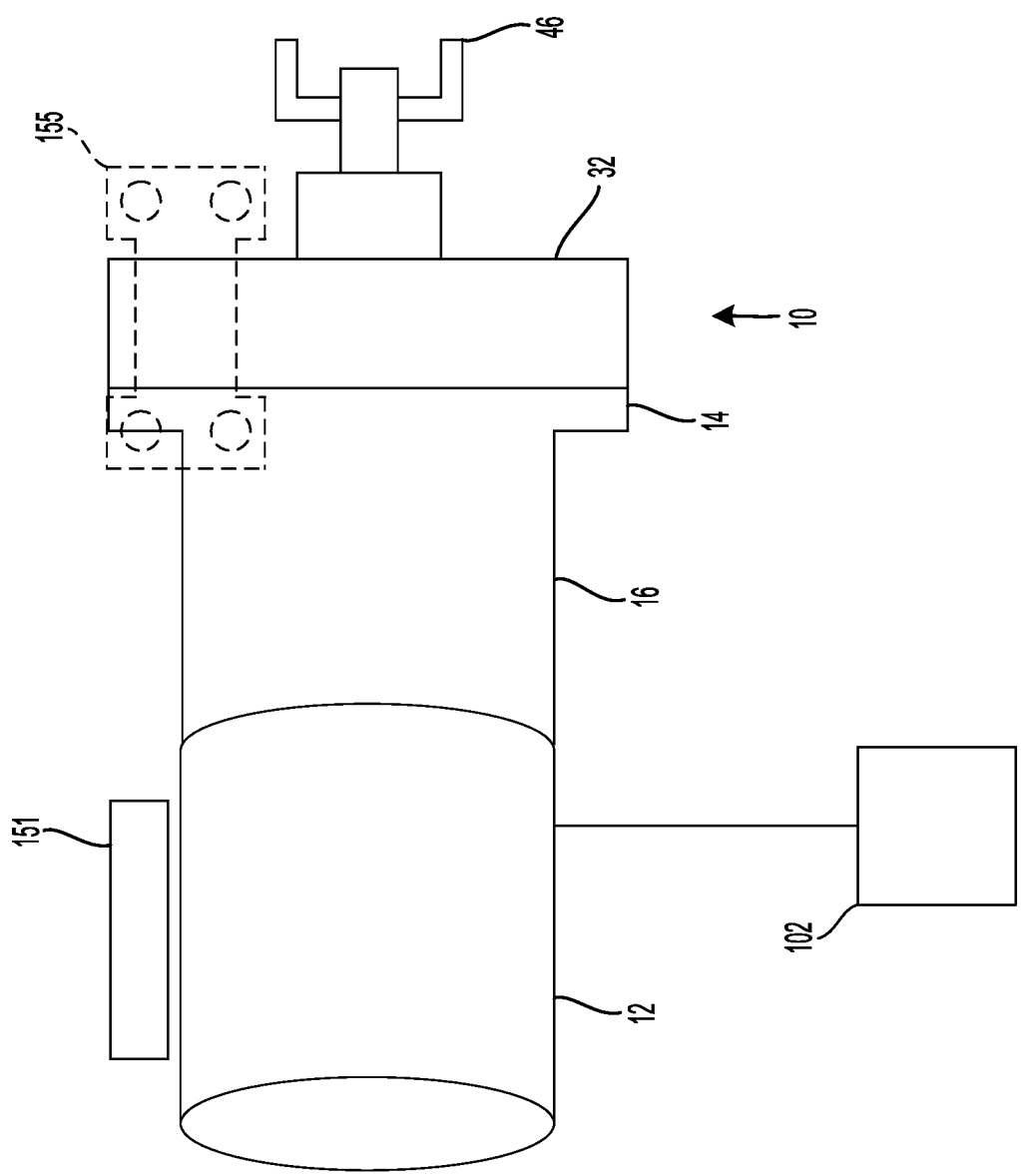
FIG. 1 illustrates a schematic perspective view of an electric axle assembly.
Figure 2:
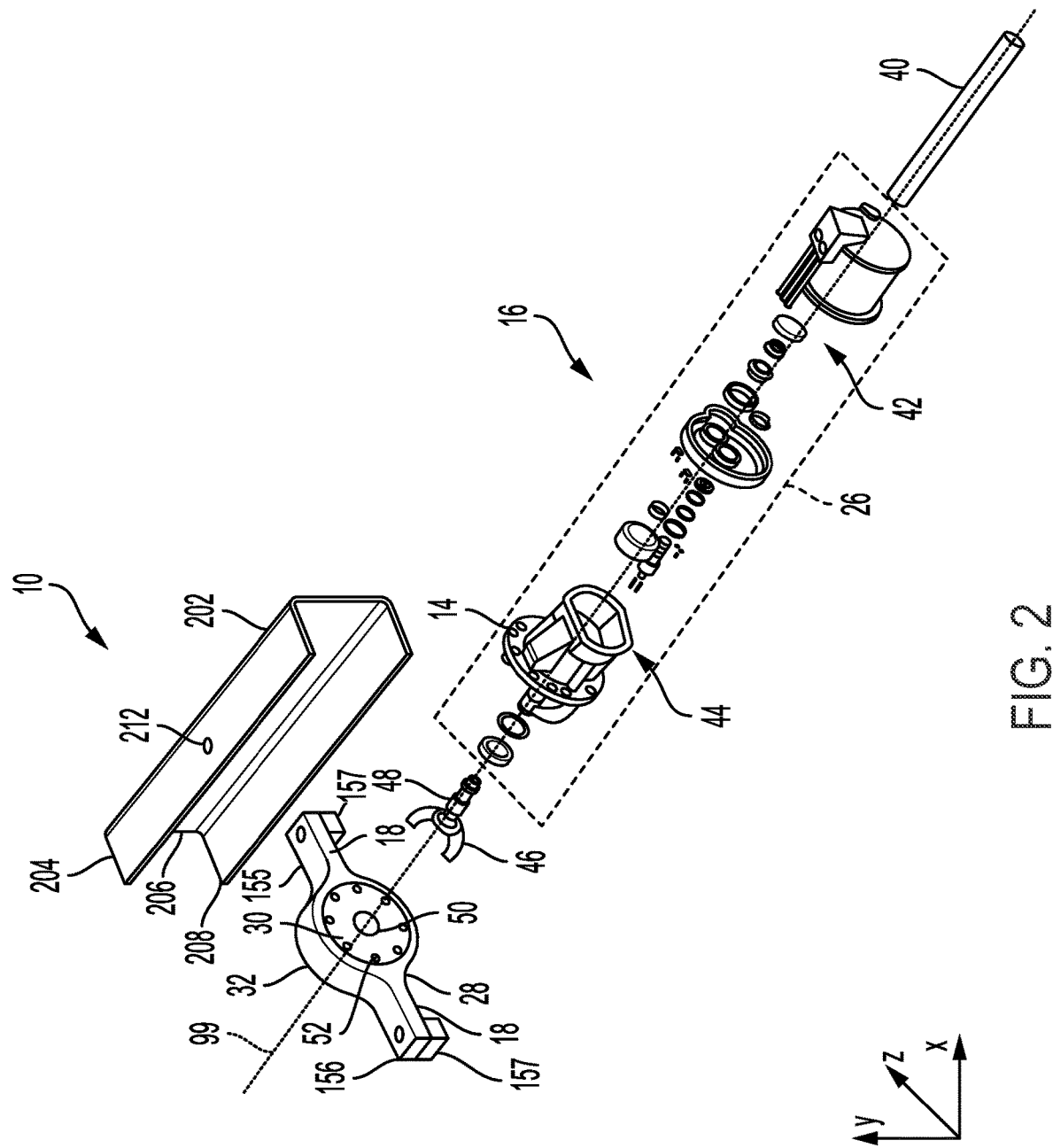
FIG. 2 illustrates a schematic exploded view of the electric axle assembly illustrated in FIG. 1.
Figure 3:
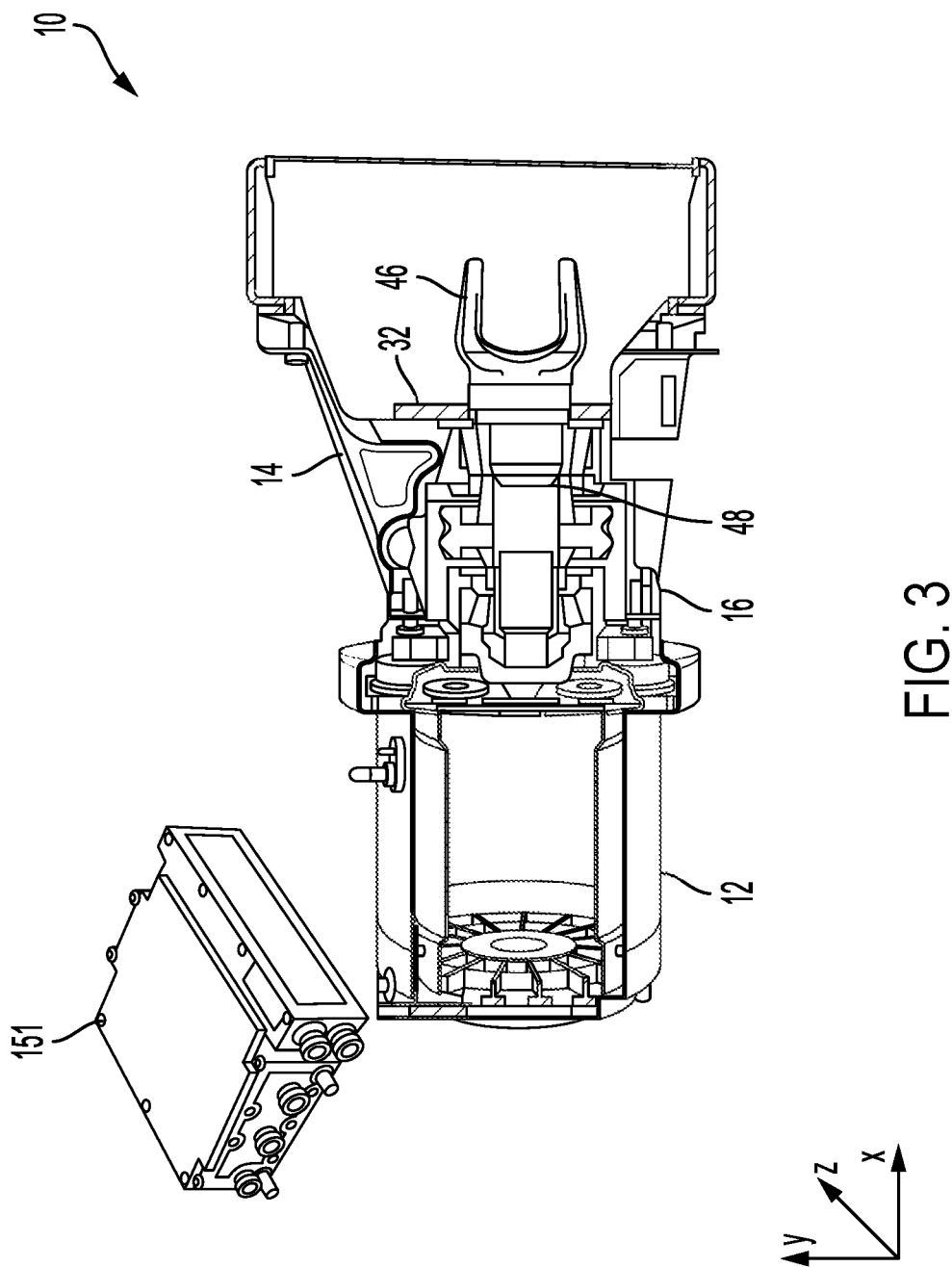
FIG. 3 illustrates a schematic sectional view of the electric axle assembly illustrated in FIGS. 1 and 2.
Figure 4:
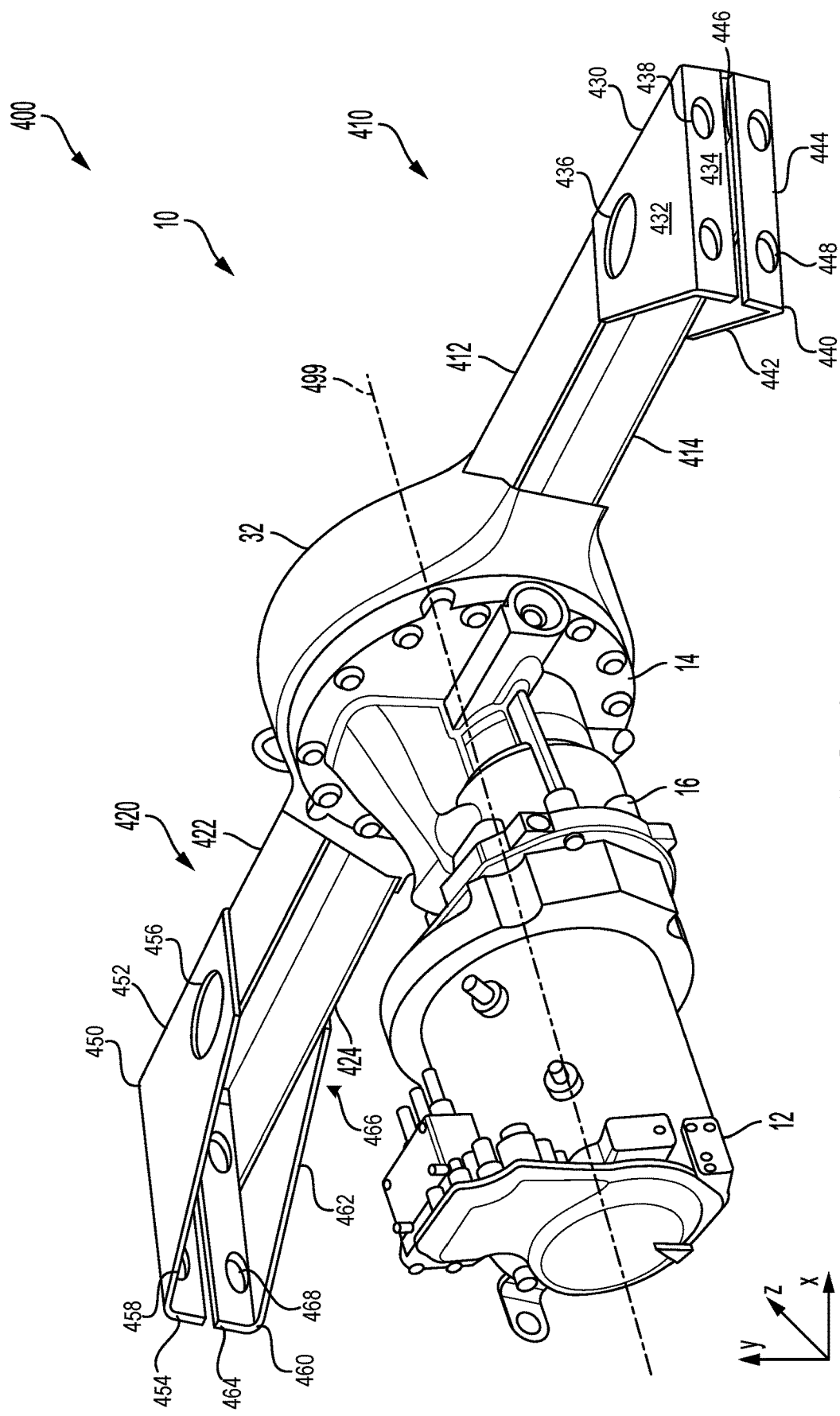
FIG. 4 illustrates a schematic perspective view of an alternative embodiment of the electric axle assembly.
Figure 5:
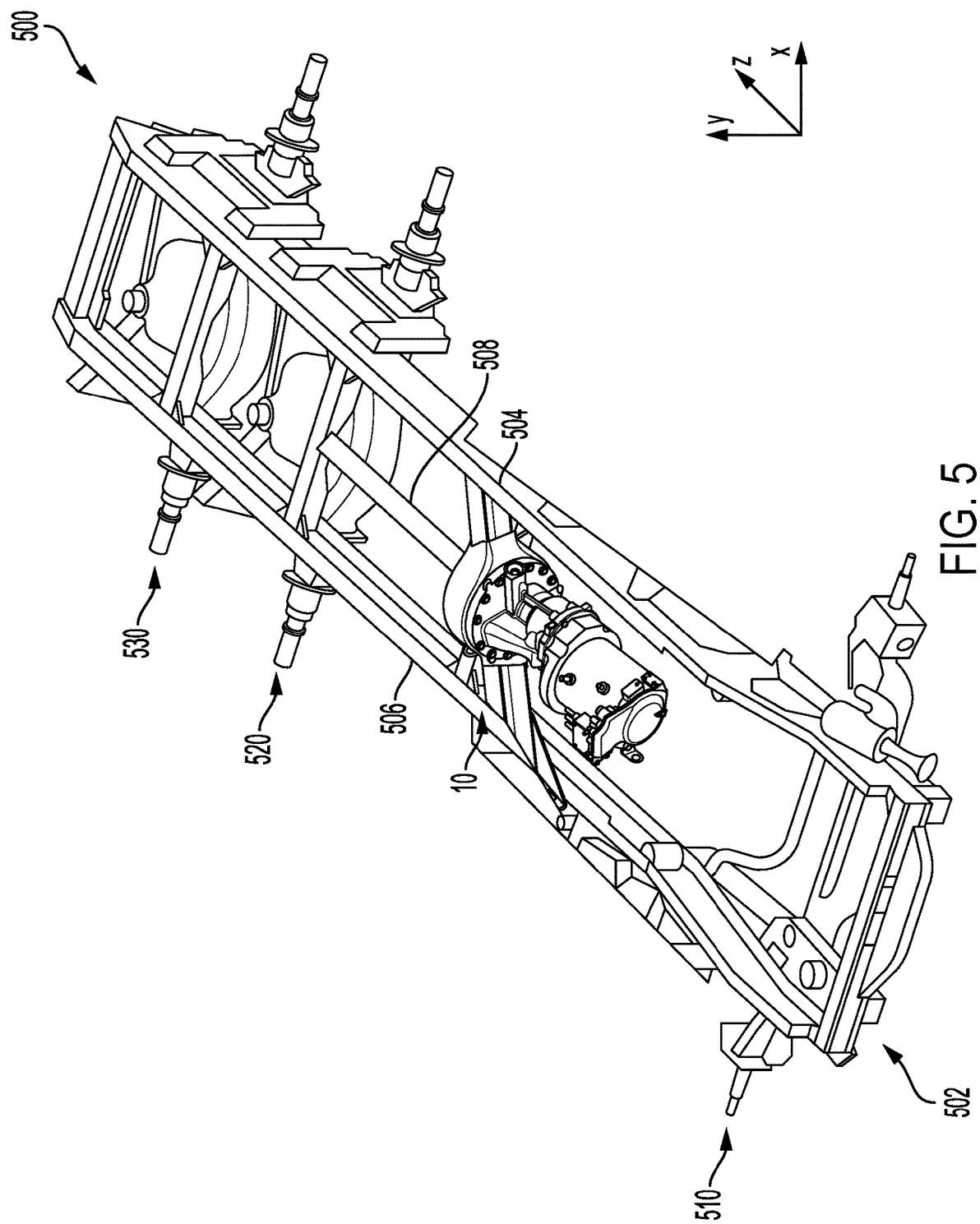
FIG. 5 illustrates an example arrangement of a vehicle in which the electric axle assembly is arranged.

The following description relates to systems and methods for a cover for an electric axle assembly that may be used in automotive, off-road vehicle, all-terrain vehicle, construction, and structural applications. As a non-limiting example, the cover for the electric axle assembly disclosed herein may also be used in passenger vehicle, electric vehicle, hybrid vehicle, commercial vehicle, autonomous vehicle, semi-autonomous vehicle and/or heavy vehicle applications. The electric axle assembly disclosed herein may be a single axle assembly or may be configured as part of a tandem axle assembly and/or a tridem axle assembly. FIGS. 1-3 illustrate a first example of the electric axle assembly. FIG. 4 illustrates a second example of the electric axle assembly. FIG. 5 illustrates an example vehicle in which the electric axle assembly is used.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a perspective view of an electric axle assembly 10 including an electric motor 12 of an electric system. The electric system is further illustrated in FIGS. 2 and 3 which are described in tandem with FIG.

1 herein. The electric axle assembly 10 may be referred to as an electric axle head assembly and/or an electric axle carrier assembly. The electric motor 12 may be configured as an electro-mechanical energy converter for converting electricity to mechanical power. In one embodiment, the electric motor 12 is a hollow rotor electric motor comprising a hollow rotor shaft extending therefrom. In some embodiments, additionally or alternatively, the electric motor 12 may not be hollow.

The electric motor 12 may be energized via electricity provided via an energy storage device 102. In one example, the energy storage device 102 is a battery. The electric motor 12 may be configured to output rotational movement and torque. In one embodiment, the electric motor 12 may be further configured to function as an electric generator during a braking operation, which may convert a brake force into electricity (e.g., regenerative braking). The electric motor 12 may comprise a variety of different motor types and sizes. The electric motor 12 may also be operated at a variety of different speeds, including single speed, two-speed, three-speed, etc. Additionally or alternatively, the electric axle assembly 10 may comprise an inverter 151 arranged proximally to the electric motor 12. The inverter 151 may be integrally included to reduce a cost of cables and utilize a cooling circuit of the electric motor 12.

Even though the electric axle assembly 10 is illustrated as being in a motor vehicle comprising the electric motor 12, it may also be used in other vehicles or equipment that comprise a prime mover that outputs rotational movements. Additionally or alternatively, the electric motor 12 may be used in light-duty, medium-duty, heavy-duty, and/or high-performance applications.

The electric axle assembly 10 comprises an axle housing 14, a differential assembly 16, a differential case 26, and one or more axle shaft housing 18. The axle housing 14 may have a size and a shape to receive and/or retain various components of the electric axle assembly 10. The axle housing 14 may be configured to mount the electric axle assembly 10 to the vehicle. The axle housing 14 may comprise multiple housing components that may be assembled together via welds, fasteners, adhesives, and the like. The axle housing 14 may partially define a center portion 30.

The center portion 30 may be arranged proximate to the center of the axle housing 14 and may define a cavity configured to receive a portion of the differential assembly 16. A central axis 99 extends through a geometric center of the differential assembly 16 and a center of the center portion 30. A portion of the two axle shaft housings 18 may be integrally connected to opposing ends of the axle housing 14. Each of the axle shaft housings 18 may comprise a size and a shape to receive at least a portion of an axle half shaft 28 therein. The axle shaft housings 18 may each have a hollow configuration or a tubular configuration that may extend around the axle half shafts 28. Each of the axle half shafts 28 may be drivingly connected to ends of the differential assembly 16.

As illustrated in FIG. 2, the axle shaft housings 18 extend in opposite directions from the center portion 30. In one example, the axle shaft housings 18 extend in a direction normal to the central axis 99. The center portion 30 may be disposed proximate the center of the axle housing 14. The center portion 30 may define a cavity that may receive the differential assembly 16. The differential assembly 16 may be configured to transmit torque to wheel assemblies and to permit the wheel assemblies to rotate at different velocities.

As shown in FIGS. 1-3, rotational energy is provided to the axle assembly 10 through an input shaft 40. The input shaft 40 may be coupled to a vehicle drivetrain component, such as a drive shaft. Alternatively, the input shaft 40 may be operatively connected to an output of another axle assembly.

The differential case 26 may support the differential assembly 16 and facilitate mounting of the differential assembly 16 to the axle housing 14. The differential case 26 may cooperate with the axle housing 14 to receive and enclose the differential assembly 16.

The electric motor 12 may be spaced apart from the axle housing 14 and may be disposed proximate to the differential assembly 16. The electric motor 12 may be electrically coupled to a power source, such as a battery and/or a capacitor that may provide and/or store electrical energy.

As shown in FIG. 2, the differential assembly 16 includes a first gear set 42 secured to and rotated with the input shaft 40. In an embodiment, the first gear set 42 includes one or more input helical gears. The first gear set 42 may interact with a second gear set 44 to achieve a double reduction. In an embodiment, the second gear set 44 includes one or more hypoid gears. Since the first gear set 42 and the second gear set 44 are rigidly connected on the input shaft 40, the input helical gears and the hypoid gears may drive at the same speed to incrementally reduce the speed of the gear ratios of all of the gears 42, 44.

As shown in FIGS. 1-3, an input yoke 46 may be coupled to the second gear set 44. However, it will be appreciated that the input yoke 46 may be coupled to the first gear set 42 in some examples. The input yoke 46 includes a yoke shaft 48 that passes through a yoke exit 50 of the center portion 30 of the axle assembly 10. In an embodiment, the input yoke 46 may be coupled to the input shaft 40, which may be coupled to a torque source, such as a transmission or another axle assembly. As a result, the input yoke 46 may propel the axle assembly 10 without a pinion gear.

The axle housing 14 is at least partially surrounded by an axle cover 32. The axle cover 32 may be selectively and fixedly mounted to the axle housing 14 via one or more of welds, fasteners, adhesives, fusions, and the lie. In one example, the axle cover 32 is bolted to the axle housing 14 via a plurality of bolts extending through a plurality of apertures 52 arranged to match a mounting assembly on the axle housing 14. In an embodiment, the axle cover 32 is a cover plate that is mounted around the center portion 30 of the axle housing 14. The axle cover 32 may comprise a variety of materials, including plastic, metal, and the like.

One end of the yoke shaft 48 may extend through the yoke exit 50 at the center portion 30 of the axle housing 14, wherein the yoke exit 50 may be a centrally arranged aperture of the one or more apertures 52. In one example, the one or more apertures 52 are symmetrically arranged around the axle cover 32. The central axis 99 may further pass through a center of the yoke shaft 48.

In some embodiments, the axle assembly 10 also comprises one or more integral inverters 151 configured to be in electrical communication with the electric motor 12. This allows for the elimination of cables and the presence of integral cooling circuits within the axle assembly 10.

In one example, the axle cover 32 comprises a set of cross-members including a first cross-member 155 and a second cross-member 156. The first cross-member 155 may be configured to physically couple to a first frame rail 202 and the second cross-member 156 may be configured to physically couple to a second frame rail of a vehicle frame rail. The first frame rail 202 comprises a first surface 204, normal to a second surface 206, and parallel to a third surface 208, wherein the third surface 208 is normal to the second surface 206. In one example, the first frame rail 202 comprises a U-shape. The second frame rail may be identically shaped to the first frame rail 202.

The first cross-member 155 is configured to fit between the first surface 204 and the third surface 208. A fastener may extend through an opening 212 of the first surface 204, wherein the fastener further extends through an opening 214 of the first cross-member 155. As such, the first cross-member 155 may be immovable.

The first cross-member 155 comprises a lower portion 157 that may be in face-sharing contact with the second surface 206 and the third surface 208. The lower-portion 157 may comprise a material different than a material of the first cross-member 155. For example, the first cross-member 155 may comprise a material with a hardness greater than a hardness of the lower portion 157. Additionally or alternatively, the material of the first cross-member 155 may be identical to the material of the lower portion 157.

The lower portion 157 extends in a direction normal to the central axis 99, in a direction parallel to the second surface 206. The second cross-member 156 may also comprise a lower portion 158, identical to the lower portion 157 of the first cross-member 155.

FIG. 3 illustrates a schematic sectional view of the electric axle assembly 10 illustrated in FIGS. 1 and 2. Therein, the yoke 46 comprises a C-shape and/or a U-shape. The yoke 46 may engage with a shaft or other device in order to rotate two or more wheels.

Turning now to FIG. 4, it shows an embodiment 400 of the electric axle assembly 10. As such, components previously introduced are similarly numbered in this figure and subsequent figures. The embodiment 400 may differ from the embodiments of FIGS. 1-3 in that a cross-member 402 comprises a first portion 410 and a second portion 420. The first portion 410 and the second portion 420 extend from the cover plate 32 in a direction normal to a central axis 499 of the electric axle carrier.

In one example, the first portion 410 and the second portion 420 are identical in size and shape. Additionally or alternatively, the first portion 410 and the second portion 420 may differ in one or more of size and shape. The first portion 410 comprises a first upper arm 412 and a first lower arm 414. In one example, the first upper arm 412 and the first lower arm 414 comprise a rectangular shape. However, other shapes may be used. The first upper arm 412 and the first lower arm 414 may be substantially identical. The first upper arm 412 and the first lower arm 414 are uniformly spaced away from one another. The second portion 420 comprises a second upper arm 422 and a second lower arm 424. In one example, the second upper arm 422 and the second lower arm 424 comprise a rectangular shape and are uniformly spaced away from one another. In one example, the second upper arm 422 and the second lower arm 424 are substantially identical to the first upper arm 412 and the first lower arm 414.

The first upper arm 412 is physically coupled to a first upper mating feature 430 and the first lower arm 414 is physically coupled to a first lower mating feature 440. The first upper mating feature 430 comprises a first surface 432 and a second surface 434, wherein the first surface 432 is normal to the second surface 434. The first surface 432 comprises an opening 436 and the second surface 434 comprises a plurality of openings 438. In one example, the opening 436 and the plurality of openings 438 may receive a fastener which may engage with a frame rail of a vehicle.

The first lower mating feature 440 comprises a first surface 442 and a second surface 444, wherein the first surface 442 is normal to the second surface 444. The first surface 442 comprises an opening 446 and the second surface 444 comprises a plurality of openings 448. In one example, the opening 446 and the plurality of openings 448 may receive a fastener which may engage with the same frame rail of the vehicle as the first upper mating feature 430.

The second upper arm 422 is physically coupled to a second upper mating feature 450 and the second lower arm 424 is physically coupled to a second lower mating feature 460. The second upper mating feature 450 comprises a first surface 452 and a second surface 454, wherein the first surface 452 is normal to the second surface 454. The first surface 452 comprises an opening 456 and the second surface 454 comprises a plurality of openings 458. In one example, the opening 456 and the plurality of openings 458 may receive a fastener which may engage with a frame rail of a vehicle different than a frame rail with which the first upper mating feature 430 engages. The lower mating feature 460 comprises a first surface 462 and a second surface 464, wherein the first surface 462 is normal to the second surface 464. The first surface 462 comprises an opening 466 and the second surface 464 comprises a plurality of openings 468. In one example, the opening 46 and the plurality of openings 468 may receive a fastener which may engage with the same frame rail as the second upper mating feature 450.

In one example, the first surfaces 432, 442, 452, and 462 comprise a trapezoidal shape. However, it will be appreciated that the first surfaces 432, 442, 452, and 462 may comprise a triangular, square, rectangular, pentagonal, or other similar shape without departing from the scope of the present disclosure. The second surfaces 434, 444, 454, and 462 may comprise a rectangular shape. However, it will be appreciated that the second surfaces 434, 444, 454, and 464 may comprise a triangular, square, rectangular, pentagonal, or other similar shape without departing from the scope of the present disclosure.

In one example, the second surfaces are bent relative to the first surfaces from which they extend. The second surfaces may extend toward one another across the space that separates the upper and lower arms. For example, the second surfaces 434 and 444 extend toward one another such that a space between them is less than a space between the first upper arm 412 and the second upper arm 414.

As illustrated in the example of FIG. 4, the first portion 410 and the second portion 420 extend from the cover plate 32, wherein the cover plate 32 is bolted to the electric axle head assembly 10. The cover plate 32 is configured to fluidly seal the electric axle head assembly 10 while the integrally arranged first and second portions extending therefrom allow. In one example, the cover plate 32, the first portion 410, and the second portion 420 are cast as one piece. However, in some examples, additionally or alternatively, the first portion and the second portion may be cast separately from the cover plate 32.

Turning to FIG. 5, it shows an embodiment 500 of a frame 502 to which the electric axle head assembly 10 is mounted. In the example of FIG. 5, the frame 502 is a vehicle frame for a light, medium, or heavy duty vehicle. The electric axle head assembly 10 is mounted to a first rail 504 and a second rail 506 of the frame 502.

A driveshaft 508 receives an output from the electric axle head assembly 10 and transfers the output to a wheel set of a plurality of wheel sets. More specifically, there is a first wheel set 510, a second wheel set 520, and a third wheel set 530. The driveshaft 508 may engage with the yoke (e.g., yoke 46 of FIG. 2) and operate in response to an output therefrom. The driveshaft 508 may then drive an axle of the second wheel set 520, which may result in movement of the vehicle. It will be appreciated that the driveshaft 508 may be coupled to the first wheel set 510 or the third wheel set 530 instead of the second wheel set 520. Additionally or alternatively, the driveshaft 508 may be configured to directly drive multiple of the wheel sets without departing from the scope of the present disclosure.

In this way, an electric axle comprises a head assembly sealed via a cover plate. The cover plate comprises mounts extending therefrom. The mounts are configured to physically couple to rails of a vehicle. The technical effect of the mounts and the cover plate is to enhance an existing configuration of the head assembly while eliminating a ring gear, a differential case, and differential bearings. A yoke along with a yoke shaft outputs energy from a gear arrangement to a driveshaft to drive wheels of the vehicle. By doing this, oil cooling may be enhanced and a power capability may be increased. Furthermore, an integral inverter may be utilized, which may decrease cable costs while utilizing pre-existing coolant circuits.

An example of a system includes a cover plate for a head assembly, wherein a cross-member is integrated into the cover plate and configured to attach to a vehicle frame.

A first example of the system, further includes where the head assembly is an electric axle carrier head assembly.

A second example of the system, optionally including the first example, further includes where the cover plate comprises an opening through which a yoke shaft extends.

A third example of the system, optionally including one or more of the previous examples, further includes where the yoke shaft couples to a drive axle.

A fourth example of the system, optionally including one or more of the previous examples, further includes where the cross-member extends in a direction normal to a central axis of the yoke shaft.

An embodiment of an electric system, comprising an electric motor and an electric axle carrier, wherein a cover plate is physically coupled to a head assembly of the electric axle carrier; and a cross-member extending from the cover plate, wherein the cross-member is configured to couple to a vehicle frame.

A first example of the electric system further includes where the cross-member comprises a first portion and a second portion, wherein the first portion and the second portion extend from the cover plate in a direction normal to a central axis of the electric axle carrier.

A second example of the electric system, optionally including the first example, further includes where the first portion and the second portion are identical in size and shape.

A third example of the electric system, optionally including one or more of the previous examples, further includes where the first portion comprises a first upper arm and a first lower arm, wherein the first upper arm is coupled to a first upper mating feature and the first lower arm is coupled to a first lower mating feature.

A fourth example of the electric system, optionally including one or more of the previous examples, further includes where the first upper mating feature comprises a first upper surface comprising a trapezoidal shape, wherein the first upper mating feature further comprises a first lower surface extending from the first upper surface in a direction normal to the first upper surface and the central axis of the electric axle carrier.

A fifth example of the electric system, optionally including one or more of the previous examples, further includes where the first lower mating feature comprises a second upper surface comprising the trapezoidal shape, wherein the first lower mating feature further comprises a second lower surface extending from the second upper surface in the direction normal to the second upper surface and the central axis of the electric axle carrier, wherein the second lower surface extends toward the first lower surface.

A sixth example of the electric system, optionally including one or more of the previous examples, further includes where a first gap is arranged between the first upper arm and the first lower arm, and wherein a second gap is arranged between the first lower surface and the second lower surface, wherein the first gap is larger than the second gap.

A seventh example of the electric system, optionally including one or more of the previous examples, further includes where the first lower surface and the second lower surface comprise through-holes, wherein each of the through-holes is configured to receive a fastener, wherein the fastener physically couples the first lower surface and the second lower surface to the vehicle frame.

An eighth example of the electric system, optionally including one or more of the previous examples, further includes where the cover plate is bolted to the head assembly.

A ninth example of the electric system, optionally including one or more of the previous examples, further includes where the cover plate comprises an opening for receiving a yoke output of the electric axle carrier.

An example of a system includes an electric axle system comprising an electric motor and a yoke shaft, an input helical gear set configured to receive an output from the electric motor and a hypoid gear set configured to receive a helical gear set output and provide an input to the yoke shaft, a cover plate physically coupled to a head assembly of the electric axle system, wherein the cover plate comprises a central opening configured to receive the yoke shaft and a yoke, and wherein the cover plate further comprises a plurality of openings spaced radially outward relative to the central opening, wherein fasteners extend through the plurality of openings and engage with the head assembly, and a cross-member extending from the cover plate and configured to attach to first and second frame rails of a vehicle, wherein the cross-member comprises a first portion and a second portion, wherein the first portion extends toward the first frame rail and the second portion extends toward the second frame rail.

A first example of the system further includes where the first portion comprises a first mating feature and the second portion comprises a second mating feature, wherein the first mating feature is bolted to the first frame rail and the second mating feature is bolted to the second frame rail.

A second example of the system, optionally including the first example, further includes where the electric axle system is free of a ring gear, a differential case, differential bearings, and a pinion gear, and wherein the yoke shaft is connected to a drive axle.

A third example of the system, optionally including one or more of the previous examples, further includes where the cover plate seals the head assembly.

A fourth example of the system, optionally including one or more of the previous examples, further includes where the cross-member is integral to the cover plate.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cover plate for a head assembly, wherein a cross-member is integrated into the cover plate and configured to physically couple to a vehicle frame via a fastener extending through an opening of the vehicle frame and an opening of the cross-member.

2. The system of claim 1, wherein the head assembly is an electric axle carrier head assembly.

3. The system of claim 1, wherein the yoke shaft couples to a drive axle.

4. The system of claim 1, wherein the cross-member extends in a direction normal to a central axis of the yoke shaft.

5. An electric system, comprising:
an electric motor and an electric axle carrier, wherein a cover plate is physically coupled to a head assembly of the electric axle carrier; and
a cross-member extending from the cover plate, wherein the cross-member is configured to directly physically couple to a vehicle frame, wherein the cross-member comprises a first portion and a second portion, and wherein the first portion and the second portion extend from the cover plate in a direction normal to a central axis of the electric axle carrier, the first portion comprising an opening that receives a fastener extending through a surface of the vehicle frame in a direction normal to the first portion, the second portion, and the central axis.

6. The electric system of claim 5, wherein the first portion and the second portion are identical in size and shape.

7. The electric system of claim 5, wherein the first portion comprises a first upper arm and a first lower arm, wherein the first upper arm is coupled to a first upper mating feature and the first lower arm is coupled to a first lower mating feature.

8. The electric system of claim 7, wherein the first upper mating feature comprises a first upper surface comprising a trapezoidal shape, wherein the first upper mating feature further comprises a first lower surface extending from the first upper surface in a direction normal to the first upper surface and the central axis of the electric axle carrier.

9. The electric system of claim 8, wherein the first lower mating feature comprises a second upper surface comprising the trapezoidal shape, wherein the first lower mating feature further comprises a second lower surface extending from the second upper surface in the direction normal to the second upper surface and the central axis of the electric axle carrier, wherein the second lower surface extends toward the first lower surface.

10. The electric system of claim 9, wherein a first gap is arranged between the first upper arm and the first lower arm, and wherein a second gap is arranged between the first lower surface and the second lower surface, wherein the first gap is larger than the second gap.

11. The electric system of claim 9, wherein the first lower surface and the second lower surface comprise through-holes, wherein each of the through-holes is configured to receive a fastener, wherein the fastener physically couples the first lower surface and the second lower surface to the vehicle frame.

12. The electric system of claim 5, wherein the cover plate is bolted to the head assembly.

13. A system, comprising:
an electric axle system comprising an electric motor and a yoke shaft;
an input helical gear set configured to receive an output from the electric motor and a hypoid gear set configured to receive a helical gear set output and provide an input to the yoke shaft;
a cover plate physically coupled to a head assembly of the electric axle system, wherein the cover plate comprises a central opening configured to receive the yoke shaft and a yoke, and wherein the cover plate further comprises a plurality of openings spaced radially outward relative to the central opening, wherein fasteners extend through the plurality of openings and engage with the head assembly; and
a cross-member extending from the cover plate and configured to attach to first and second frame rails of a vehicle, wherein the cross-member comprises a first portion and a second portion, wherein the first portion extends toward the first frame rail and the second portion extends toward the second frame rail.

14. The system of claim 13, wherein the first portion comprises a first mating feature and the second portion comprises a second mating feature, wherein the first mating feature is bolted to the first frame rail and the second mating feature is bolted to the second frame rail.

15. The system of claim 13, wherein the electric axle system is free of a ring gear, a differential case, differential bearings, and a pinion gear, and wherein the yoke shaft is connected to a drive axle.

16. The system of claim 13, wherein the cover plate seals the head assembly.

17. The system of claim 13, wherein the cross-member is integral to the cover plate.

* * * * *